(12) United States Patent
Whitlatch

(10) Patent No.: US 11,565,225 B1
(45) Date of Patent: Jan. 31, 2023

(54) WEIGHTED WELL MATERIAL DISTRIBUTION SYSTEMS AND METHODS

(71) Applicant: Blake Whitlatch, Baton Rouge, LA (US)

(72) Inventor: Blake Whitlatch, Baton Rouge, LA (US)

(*) Notice: Subject to any disclaimer, the term of this patent is extended or adjusted under 35 U.S.C. 154(b) by 518 days.

(21) Appl. No.: 16/773,214

(22) Filed: Jan. 27, 2020

Related U.S. Application Data

(63) Continuation-in-part of application No. 16/298,258, filed on Mar. 11, 2019, now abandoned.

(51) Int. Cl.
| | | |
|---|---|---|
| *B01F 35/00* | (2022.01) | |
| *B01F 35/71* | (2022.01) | |
| *B65B 69/00* | (2006.01) | |
| *B01F 101/49* | (2022.01) | |

(52) U.S. Cl.
CPC .... *B01F 35/7131* (2022.01); *B01F 35/71775* (2022.01); *B65B 69/0008* (2013.01); *B01F 2101/49* (2022.01)

(58) Field of Classification Search
CPC .............. B01F 2101/49; B01F 35/7131; B01F 35/71775; B65B 69/0008
See application file for complete search history.

(56) References Cited

U.S. PATENT DOCUMENTS

| | | | | |
|---|---|---|---|---|
| 2,800,964 A | * | 7/1957 | Garrick | E21B 21/003 166/293 |
| 5,303,998 A | * | 4/1994 | Whitlatch | B01F 33/80 222/394 |

\* cited by examiner

*Primary Examiner* — Anshu Bhatia
(74) *Attorney, Agent, or Firm* — R. Keith Harrison

(57) ABSTRACT

Well material distribution methods may include gravity feeding bulk well materials including at least one well material component into a mixing vessel which may include a mixing vessel interior and at least one mixing device disposed in the mixing vessel interior; forming a well material mixture by mixing the bulk well materials including at least one well material component in the mixing vessel interior of the mixing vessel via operation of the at least one mixing device; distributing the well material mixture from the mixing vessel interior of the mixing vessel to at least one mud pit; and distributing a substantially homogenous well material mixture from the at least one mud pit to a hydrocarbon well.

17 Claims, 13 Drawing Sheets

WEIGHTED WELL MATERIAL DISTRIBUTION SYSTEMS AND METHODS

CROSS-REFERENCE TO RELATED APPLICATIONS

This is a continuation-in-part of U.S. application Ser. No. 16/298,258, filed Mar. 11, 2019 and entitled WELL MATERIAL DISTRIBUTION SYSTEMS AND METHODS, which application is hereby incorporated by reference herein in its entirety.

FIELD

Illustrative embodiments of the disclosure generally relate to hydrocarbon (oil and gas) well drilling applications. More particularly, illustrative embodiments of the disclosure relate to weighted well material distribution systems and methods by which a well material mixture is homogenized by gravity-feeding bulk well materials from at least one mixer inlet silo into a mixing vessel; densifying, weighting and mixing the bulk well materials in the mixing vessel; and then gravity-feeding the bulk well materials from the mixing vessel into a mud pit to facilitate distribution of a substantially homogenous well material mixture from the mud pit to a hydrocarbon well.

BACKGROUND

The background description provided herein is solely for the purpose of generally presenting the context of the illustrative embodiments of the disclosure. Aspects of the background description are neither expressly nor impliedly admitted as prior art against the claimed subject matter.

In the drilling of hydrocarbon (oil and gas) production wells, drilling mud, also known as drilling fluid, is typically discharged from a drill bit on a drill string to augment the cutting action of the drill bit as well as to carry rock cuttings to the well surface and lubricate and cool the drill bit. As much as 100-300 MT (metric tons) of barite may be added to the drilling fluid to increase its density. The weight of the drilling fluid may be adjusted to control the pressure of the fluid as it flows from the well. The barite material may be transported to offshore rigs via boats and to land rigs via trucks.

Prior to its addition to the drilling fluid, the barite may be pneumatically distributed (blown or fluidized) to a bulk storage tank which may have a capacity of typically 1,000-4,000 cubic feet. In the bulk storage tank, the barite may be added to other well materials such as bentonite, cement and calcium carbonate. The resulting bulk well materials may be pneumatically transferred to a silo which is positioned directly above a mud jet hopper. The bulk well materials may be gravity dispensed from the silo into the mud jet hopper and from the mud jet hopper into the mud pit.

The conventional method of feeding the bulk well materials from the mud jet hopper into the mud pit suffers from several drawbacks. Because the mud pit lacks mixing capability, the drilling fluid in the mud pit lacks homogeneity as it is pumped form the mid pit downhole into the well. Due to its weight, the barite immediately falls to the bottom and settles in the corners of the mud pit, creating unnecessary waste that must be cleaned out and discarded. This results in waste of time and natural resources. Furthermore, the non-homogenous well materials pumped downhole in the wellbore of the hydrocarbon well reduce the life of pump parts and increases the incidence of downhole tool failures.

Accordingly, weighted well material distribution systems and methods by which a well material mixture is homogenized by gravity-feeding bulk well materials from at least one mixer inlet silo into a mixing vessel; densifying, weighting and mixing the bulk well materials in the mixing vessel; and then gravity-feeding the bulk well materials from the mixing vessel into a mud pit to facilitate distribution of a substantially homogenous well material mixture from the mud pit to a hydrocarbon well may be desirable for some applications.

SUMMARY

Illustrative embodiments of the disclosure are generally directed to weighted well material distribution methods. An illustrative embodiment of the well material distribution methods may include gravity feeding bulk well materials including at least one well material component into a mixing vessel which may include a mixing vessel interior and at least one mixing device disposed in the mixing vessel interior; forming a well material mixture by mixing the bulk well materials including at least one well material component in the mixing vessel interior of the mixing vessel via operation of the at least one mixing device; distributing the well material mixture from the mixing vessel interior of the mixing vessel to at least one mud pit; and distributing a substantially homogenous well material mixture from the at least one mud pit to a hydrocarbon well.

BRIEF DESCRIPTION OF ITIE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left". "rear". "right". "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
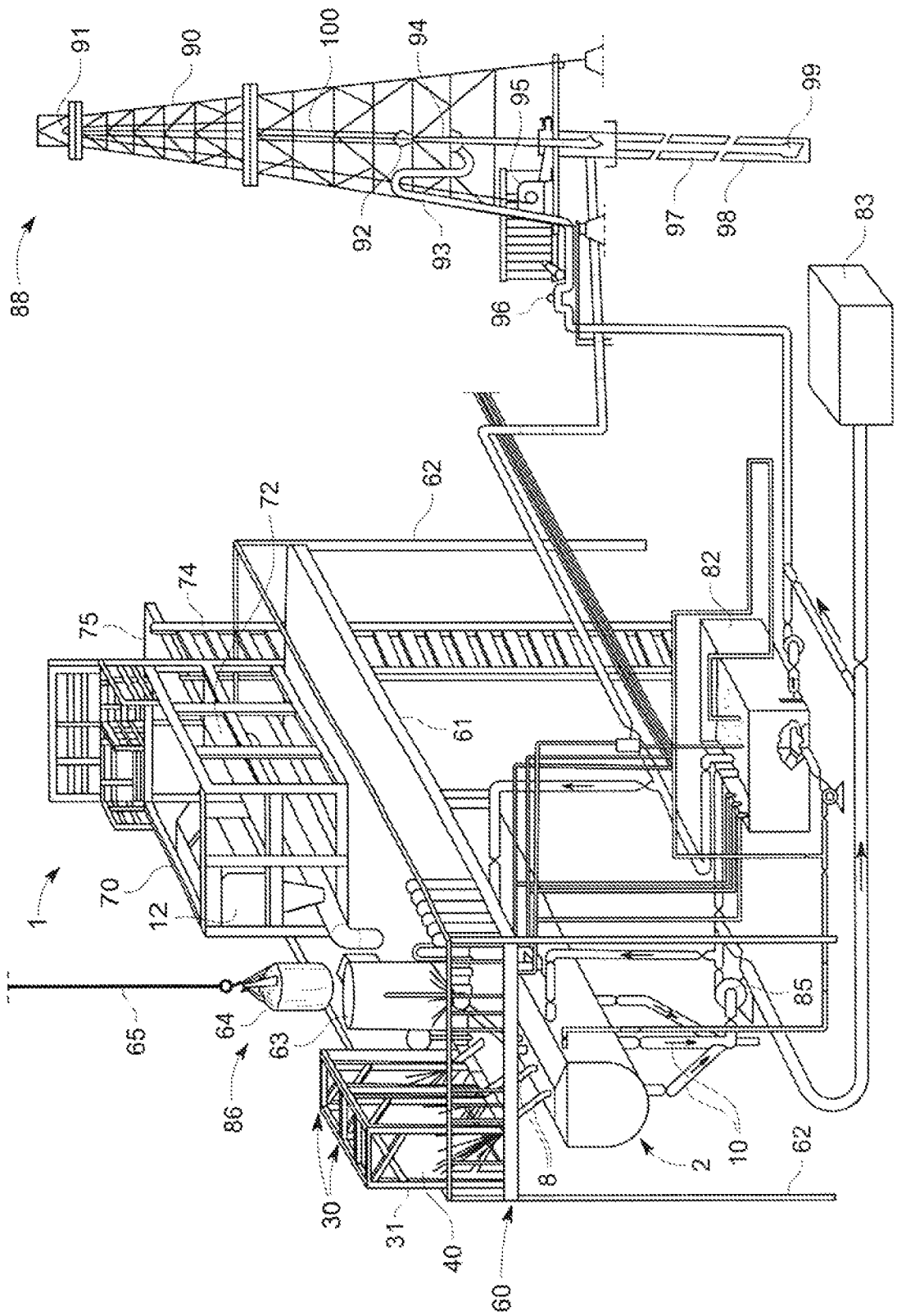
FIG. 1 is a perspective view of an illustrative embodiment of the well material distribution systems provided on a rig platform and connected to a mixing vessel in typical application of the system.

Referring initially to FIGS. 1-4 of the drawings, an illustrative embodiment of the well material distribution systems, hereinafter system, is generally indicated by reference numeral 1. As will be hereinafter described, the system 1 may be suitable for distributing well materials 46 (FIG. 4) from an automatic sack cutting machine (ASCM) 12 directly into a mixing vessel 2 which typically handles multiple well materials or components 46 such as drilling fluids, cement and cement spacers and completion brine as well as filtering and handling cuttings for zero-discharge applications, for example and without limitation. As used herein, "direct", "directly" and like terminology denotes transfer of well materials 46 from the ASCM 12 to the mixing vessel 2 without being first transferred through one or more intermediary holding vessels such as a jet hopper, for example and without limitation. The system 1 may facilitate introduction of well materials 46 from a material-containing sack 44 (FIGS. 8-12) into the mixing vessel 2 without cross-contamination for enhanced efficiency in hydrocarbon well drilling and other applications. As used herein, "well materials" include but are not limited to solid particles, powders, dust, liquids or combinations thereof which may be used in the formulation of active mud, drilling mud, cement and/or other solids or liquids used in the drilling, production, maintenance, remediation and/or other operations of a hydrocarbon well 88 (FIG. 1).

Figure 2:
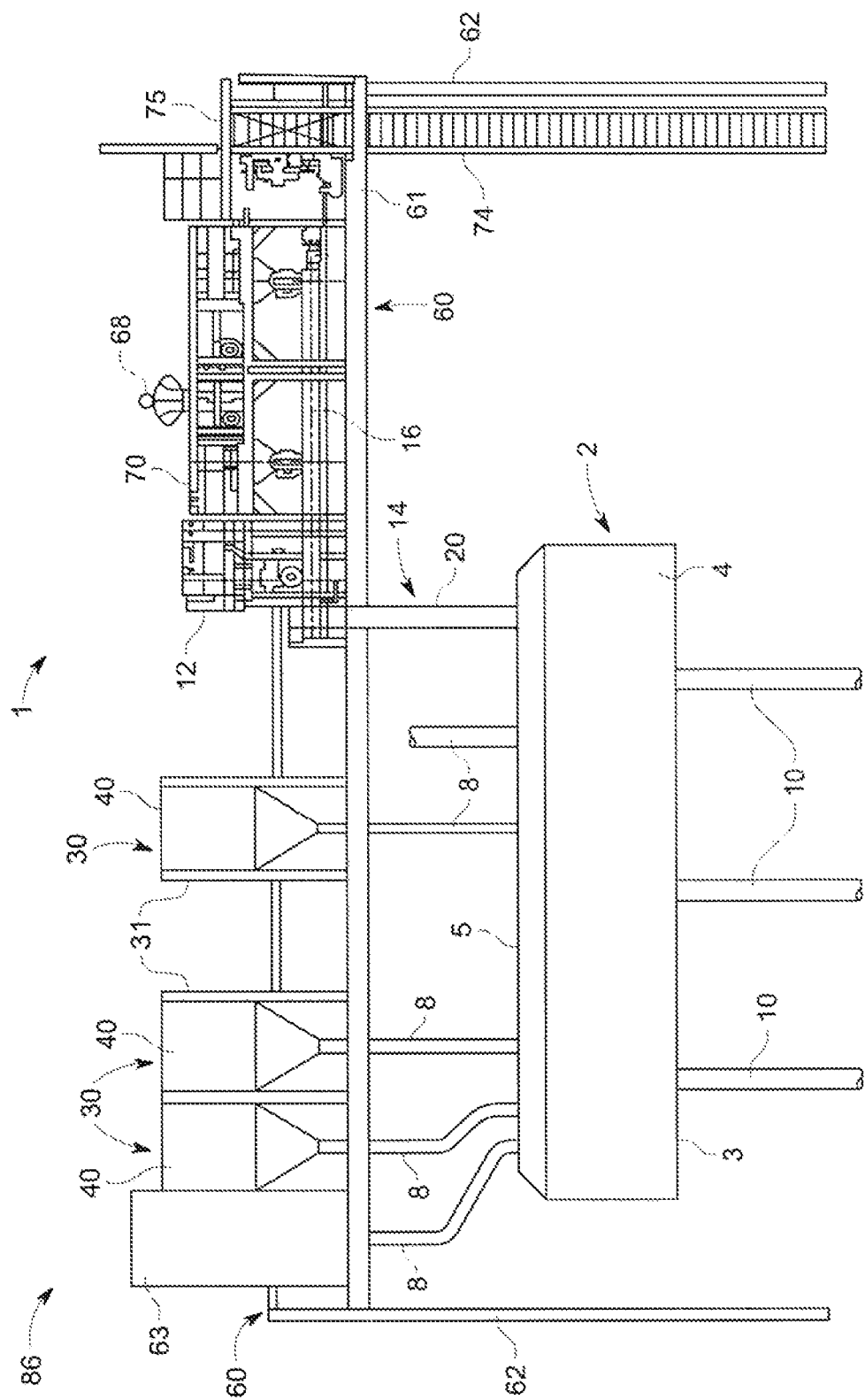
FIG. 2 is a front view of a typical mixing vessel with the illustrative well material distribution system of FIG. 1 connected to the mixing vessel through a material transfer conduit.

As illustrated in FIGS. 1 and 2 and will be hereinafter described, in some applications, the system 1 may be deployed on a rig platform 60 which provides support for the various mixing operations required in the drilling, production and/or other operations of the hydrocarbon well 88. The hydrocarbon well 88 may be an onshore well, as illustrated, or may alternatively be an offshore well. As illustrated in FIG. 1, the onshore hydrocarbon well 88 may include a hydrocarbon well rig 90 having a block and tackle 100 with a crown block 91 and a traveling block 92. A drill string 98 may be supported by the block and tackle 100. The drill string 98 may drivingly engage a drill bit 99 for rotation in formation of a subterranean wellbore beneath the hydrocarbon well rig 90. A typically cement casing 97 may encase the subterranean wellbore beneath the hydrocarbon well rig 90.

Draw works 95 may facilitate selective raising and lowering of the drill string 98 via the block and tackle 100. A mud hose 93 may be coupled to the drill string 98 typically via a swivel 94. A mud pump 96 may be coupled to the mud hose 93.

The rig platform 60 may have a conventional design with an elevated rig deck 61 which is supported by multiple rig legs 62. The rig legs 62 may be anchored in the ground (not illustrated) in the case of onshore operations, or alternatively, may be anchored in an ocean floor (not illustrated) in the case of offshore operations.

Figure 4:
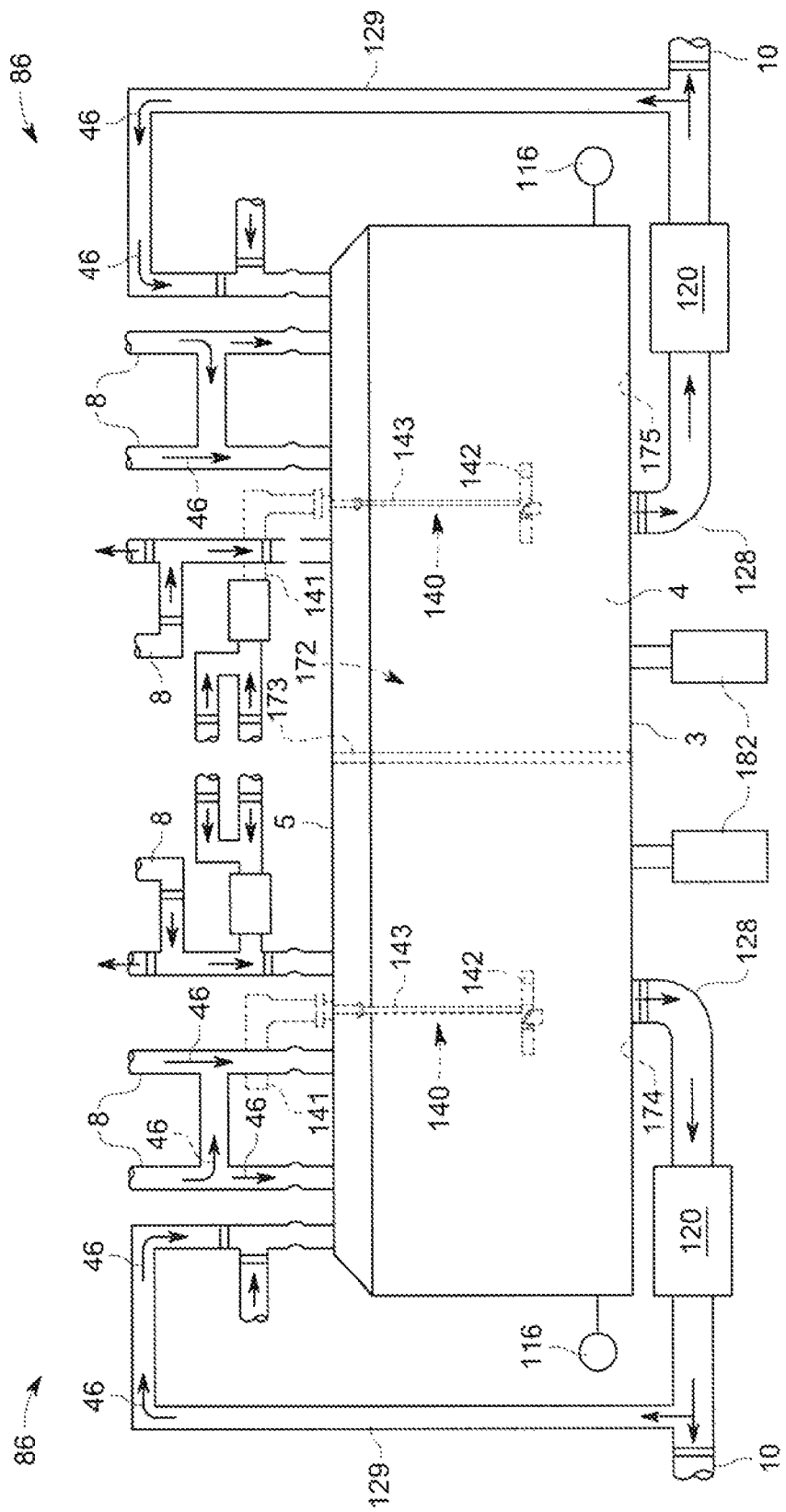
FIG. 4 is a front view of a typical mixing vessel in implementation of the well material distribution systems with various conduits and functional components connected to the mixing vessel in typical implementation of the mixing vessel.

At least one mixing vessel 2 may be disposed beneath the rig deck 61 of the rig platform 60. The mixing vessel 2 may have any suitable support structure which is suitable for the purpose. In some embodiments, the mixing vessel 2 may be the same as or similar in design to the mixing vessel described in U.S. application Ser. No. 15/885,997, filed Feb. 1, 2018 and entitled MIXING APPARATUS, which application is hereby incorporated by reference herein in its entirety. Accordingly, the mixing vessel 2 may have a generally elongated, oblong or ob-round shape. As illustrated in FIGS. 2 and 4, the mixing vessel 2 may have a mixing vessel bottom 3. A generally elongated, oblong or ob-round mixing vessel wall 4 may extend upwardly from the mixing vessel bottom 3. As illustrated in FIG. 4, the mixing vessel bottom 3 and mixing vessel wall 4 may form a mixing vessel interior 172. At least one mixing vessel partition 173 may divide the mixing vessel interior 172 into at least a first mixing compartment 174 and a second mixing compartment 175. In some non-limiting embodiments, two or more mixing vessel partitions 173 may divide the mixing vessel interior 172 into three or more mixing compartments.

A mixing vessel lid 5 may be supported by the mixing vessel wall 4. The mixing vessel lid 5 may provide for sealing of the mixing vessel interior and dust-free dumping of dry products into the mixing vessel interior in typical use of the mixing vessel 2. The mixing vessel lid 5 may be fitted with one or more viewing windows (not illustrated) which enable an operator of the mixing vessel 2 to view the contents of the mixing vessel interior during mixing. The mixing vessel lid 5 may be selectively detachable and removable from the mixing vessel wall 4 to facilitate access to the mixing vessel interior 172 for the purpose of repairing, maintaining and/or replacing paddle agitators 142 (FIG. 4) and/or other various functional components of a mixing device 140 in the mixing vessel interior 172. The mixing vessel bottom 3, the mixing vessel wall 4, the mixing vessel partition 173, the mixing vessel lid 5 and other structural components of the mixing vessel 2 may be fabricated of any material or combination of materials which renders the mixing vessel 2 suitable for its purpose. In some non-limiting embodiments, the structural components of the mixing vessel 2 may be fabricated of abrasion-resistant materials. For example and without limitation, in some non-limiting embodiments, the various structural components of the mixing vessel 2 may be fabricated of abrasion-resistant steel. In some applications, the mixing vessel 2 may utilize radioactive source technology to weigh the contents to be mixed in the mixing vessel 2.

At least one pump, supply and distribution system 86 may fluidly interface with the mixing vessel 2. As illustrated in FIGS. 1 and 2, the pump, supply and distribution system 86 may include at least one hopper 63 which may contain a supply of dry product or solid bulk material (not illustrated) such as drilling material, for example and without limitation. At least one vessel inlet conduit 8 may be disposed in communication with the hopper 63. A discharge end (not illustrated) of the vessel inlet conduit 8 may be disposed in communication with the mixing vessel interior of the mixing vessel 2 typically through the mixing vessel wall 4 or mixing vessel lid 5. Accordingly, in typical operation of the mixing apparatus 2, a selected weight or quantity of the dry product may be dispensed from the hopper 63, through the vessel inlet conduit 8 and into the mixing vessel interior 172 for mixing. The dry product may be loaded in the selected weight or quantity into the hopper 63 from a large bag 64 (FIG. 1) which may be supported by a suitable lifting assembly 65. In other non-limiting embodiments, the dry product may be pumped into the mixing vessel interior 172 of the mixing vessel 2 from a remote container (not illustrated) using any suitable dry product pump and supply mechanism. As illustrated in FIG. 4, in some embodiments, each of the first mixing compartment 174 and the second mixing compartment 175 in the mixing vessel 2 may be fitted with a corresponding pump, supply and distribution system 86 which contains, pumps and distributes the components to be mixed into each of the first mixing compartment 174 and the second mixing compartment 175.

Figure 3:
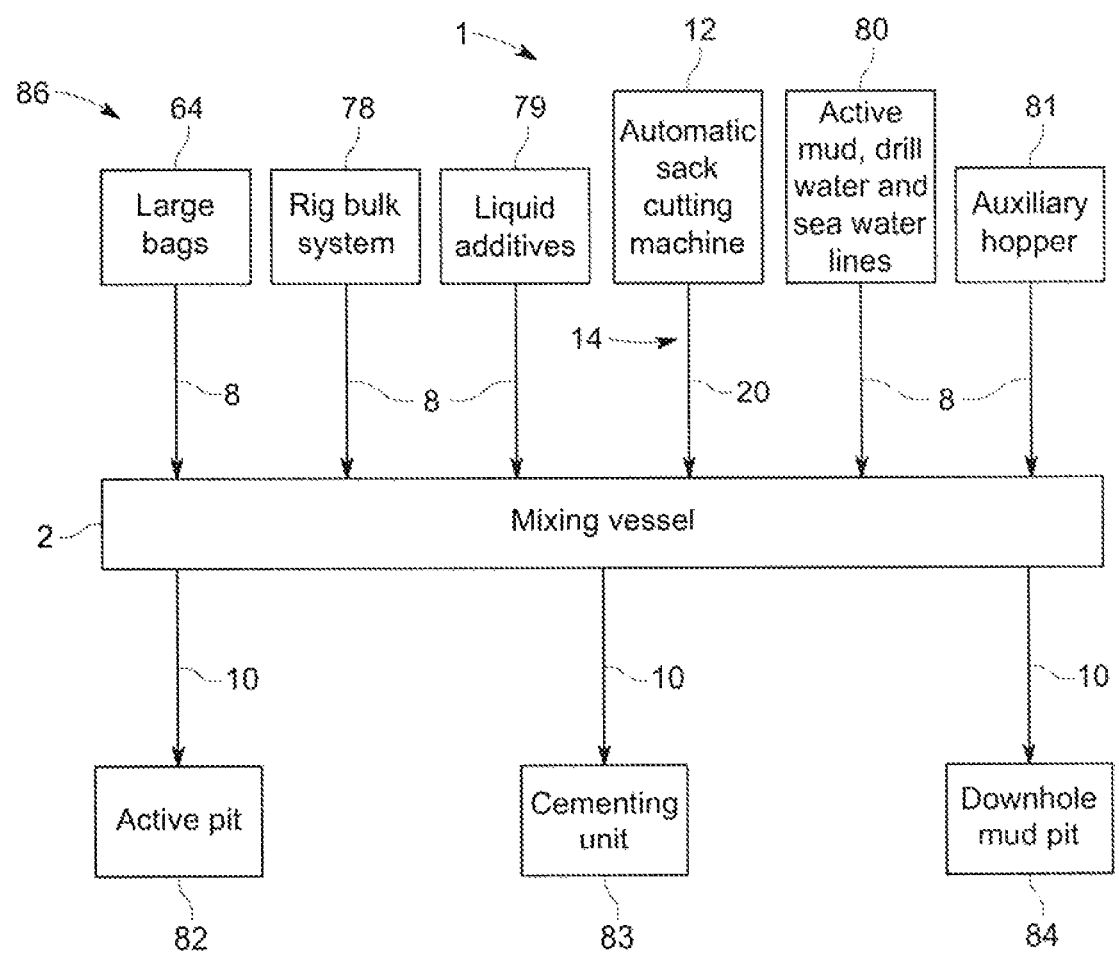
FIG. 3 is a functional block diagram of the illustrative well material distribution system and other components communicating with the mixing vessel.

As further illustrated in FIG. 3, in some non-limiting embodiments, the pump, supply and distribution system 86 may further include at least one vessel inlet conduit 8 for an existing drilling rig bulk system 78 through which a material such as barite, gel or cement, for example and without limitation, may be added to the mixing vessel interior. Other vessel inlet conduits 8 may include at least one liquid product additive line to facilitate addition of any liquid additive or combination of liquid additives 79 and/or other product to the mixing vessel 2; active mud, drill water and sea water lines 80 for delivering drilling mud to the mixing vessel 2; and/or at least one output flow line to deliver the slurry product to its destination elsewhere on the rig platform 60. At least one auxiliary hopper 81 may be connected to the mixing vessel 2 through a vessel inlet conduit 8 to facilitate addition of other products to the mixing vessel 2.

As further illustrated in FIGS. 1 and 2, in some non-limiting embodiments, the pump, supply and distribution system 86 may include at least one silo assembly 30 for containing dry products which may be used in the drilling of hydrocarbon wells, for example and without limitation. Each silo assembly 30 may include at least one structural frame 31. At least one silo vessel 40 may be supported by the structural frame 31. In some non-limiting embodiments, the silo vessel 40 may be hollow and may be constructed of welded sheets of thin steel or the like. In some embodiments, the details of the structure and use of each silo assembly 30 may be as is described in U.S. Pat. No. 5,303,998, which is hereby incorporated by reference herein in its entirety. At least one silo vessel 40 of the silo assembly 30 may be disposed in fluid communication with the mixing vessel 2 typically through a corresponding vessel inlet conduit 8, for example and without limitation. The silo assembly 30 may include the input for the large bags 64, the bulk rig system 78, the liquid additives 79, the active mud lines 80 and/or the auxiliary hopper 81.

In some applications, various components may be connected to the mixing vessel 2 through vessel outlet conduits 10. As illustrated in FIG. 3, these components may include, for example and without limitation, at least one active pit 82 and/or at least one downhole mud pit 84 which may provide drilling mud or fluid to the drill string 98 for the drilling operation. At least one cementing unit 83 may be connected to the mixing vessel 2 for the installation of casing 97, centralizers and the like in the hydrocarbon well 88. As illustrated in FIG. 1, at least one mixer discharge pump 85 may be connected to the vessel outlet conduits 10. The mixer discharge pump 85 may pump active mud from the mixing vessel 2 to the active pit 82 and/or the downhole mud pit 84 (FIG. 3). A mud pump 96 may pump the active mud from the active put 82 through the drill string 98 and from the drill bit 99 for drilling and/or other purposes.

As further illustrated in FIG. 4, at least one mixing device 140 may be disposed in each corresponding first mixing compartment 174 and second mixing compartment 175 of the mixing vessel 2. In some embodiments, each mixing device 140 may be a gear-driven vertical mixer including an electric motor 141. The electric motor 141 may be mounted on the mixing vessel lid 5 of the mixing vessel 2 using brackets, mechanical fasteners and/or other suitable attachment technique. An agitator drive shaft 143 may be drivingly engaged by the electric motor 141. The agitator drive shaft 143 may extend vertically from the electric motor 141 through a shaft opening (not illustrated) in the mixing vessel lid 5 into the mixing vessel interior 172. Paddle agitators 142 may extend from the agitator drive shaft 143. Accordingly, responsive to operation of the electric motor 141, the agitator drive shaft 143 may rotate the paddle agitators 142 in the corresponding first mixing compartment 174 or second mixing compartment 175 to mix the contents of each.

The first mixing compartment 174 and the second mixing compartment 175 in the mixing vessel interior 172 of the mixing vessel 2 may have the same or different volumes. In some non-limiting embodiments, the mixing vessel interior 172 may have a volume of about 160 barrels, and the first mixing compartment 174 and the second mixing compartment 175 may each have a volume of about 80 barrels. In other non-limiting embodiments, the volume of the vessel interior 172 may be larger or smaller than 160 barrels, and each of the first mixing compartment 174 and the second mixing compartment 175 may have a volume which is larger or smaller than 80 barrels. Each of the first mixing compartment 174 and the second mixing compartment 175 may be fitted with the abrasive-resistant paddle agitators 142 (FIG. 4) to provide a complete clean-out to each of the first mixing compartment 174 and the second mixing compartment 175 after mixing. The abrasive-resistant paddle agitators 142 may have a conventional design which is known by those skilled in the art. In some non-limiting embodiments, heavy-duty stuffing boxes (not illustrated) may be provided to the mixing vessel 2 for the purpose of preventing material from contaminating the main bearings of the abrasive resistant paddle agitators 142, as is known by those skilled in the art.

As further illustrated in FIG. 4, in some non-limiting embodiments, the mixing vessel 11 may utilize radioactive source technology to weigh the contents to be mixed in the respective first mixing compartment 174 and second mixing compartment 175 of the mixing vessel 2. A mechanical scale 116 may be provided at each end of or in any other suitable location on the mixing vessel wall 4 for fine weight measurement of the contents of the corresponding first mixing compartment 174 and second mixing compartment 175. In some non-limiting embodiments, each mechanical scale 116 may be configured to read an accurate tenth of a percent to two pounds per torr of the contents in the corresponding first mixing compartment 174 and second mixing compartment 175.

In some embodiments, at least one discharge line 128 may be disposed in fluid communication with each of the first mixing compartment 174 and the second mixing compartment 175 of the mixing vessel 2, typically through the mixing vessel bottom 3 of the mixing vessel 2. A transfer pump 120 may be provided in the discharge line 128. The transfer pump 120 may include an intake side that communicates with the discharge line 128 and a discharge side that communicates with a vessel outlet conduit 10. In some non-limiting embodiments, a vessel return conduit 129 may be disposed in fluid communication with the vessel outlet conduit 10 at the discharge side of the transfer pump 120. The vessel return conduit 129 may discharge into the corresponding first mixing compartment 174 or second mixing compartment 175 typically through the mixing vessel lid 5. Accordingly, in some applications, the vessel return conduit 129 may be used to selectively return the product mixture to the first mixing compartment 174 or second mixing compartment 175 for further mixing.

As illustrated in FIG. 4, at least one shear pump 182 may be disposed in fluid communication with each of the first mixing compartment 174 and the second mixing compartment 175. Accordingly, in some non-limiting applications, the components being mixed in the first mixing compartment 174 or the second mixing compartment 175 can be routed through the shear pump 182 for shearing of the components into smaller elements, as is known by those skilled in the art, and the sheared components then returned to the first mixing compartment 174 or second mixing compartment 175 for further mixing.

Referring next to FIGS. 1-7 of the drawings, in some applications, some or all of the well materials 46 (FIG. 4) may be obtained from one or more material-containing sacks 44 (FIGS. 8-12). Accordingly, the system 1 may include at least one automatic sack cutting machine (ASCM) 12. As illustrated in FIGS. 1 and 2, the ASCM 12 may be supported by the rig deck 61 of the rig platform 60. In some embodiments, the ASCM 12 may have a design which is the same as or similar to that disclosed in U.S. Pat. No. 9,174,755, which is hereby incorporated by reference herein in its entirety. A non-limiting example of an ASCM 12 which is suitable for the purpose is the PROCUT™ Sack Cutting Unit which can be obtained from National Oilwell Varco (www.nov.com). The ASCM 12 may run continually and perform the slitting, emptying and feeding sequence, including packing the emptied sack into a waste bag. The ASCM 12 may be capable of cutting and emptying different types of material-containing sacks 44 with well materials 46 such as mud additive chemicals, for example and without limitation. The ASCM 12 may provide a healthy and ergonomically correct workplace for an operator 68 (FIG. 2). The ASCM 12 may be capable of slitting the material-containing sack 44, separating the well material contents from the sack, packing the empty sack into a waste bag (not illustrated) and feeding the well material contents at the desired rate into the drilling fluid as the fluid is mixed in the mixing vessel 2.

As illustrated in FIGS. 1 and 2, in some applications, the ASCM 12 may be supported on the rig deck 61 of the rig platform 60. An ASCM support frame 70 may support the ASCM 12 on the rig deck 61. As illustrated in FIG. 1, in some applications, the ASCM support frame 70 may include an access scaffold 72 which provides the operator 68 (FIG. 2) access to the ASCM 12.

A sack lifting platform assembly 74 may extend from the ground to the ASCM 12. The sack lifting platform assembly 74 may include a lift platform 75. In some embodiments, the lift platform 75 may be electro-hydraulically operated and may be capable of elevating one or more of the material-containing sacks 44 to the ASCM 12. The operator 68 may slide the material-containing sack 44 from the lift platform 75 to the ASCM 12 for operation.

Figures 5, 6:
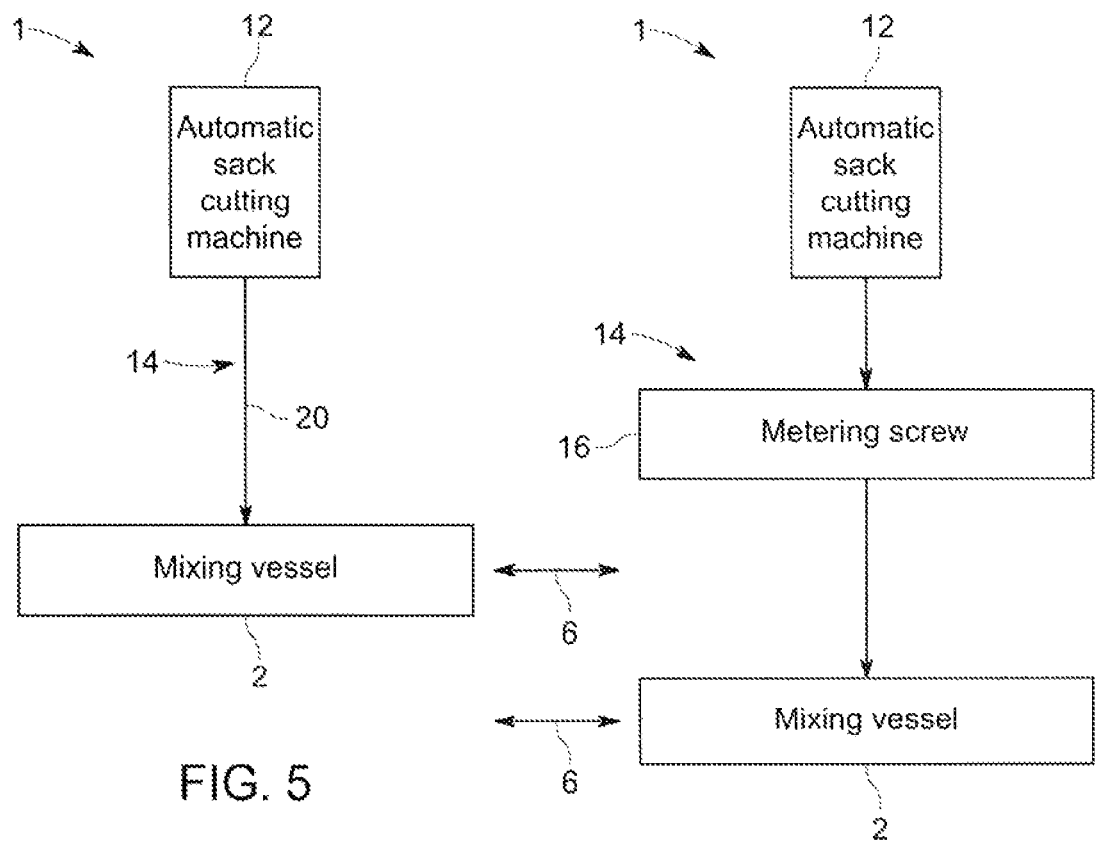
FIG. 5 is a functional block diagram illustrating a typical configuration of the well material distribution systems.
FIG. 6 is a functional block diagram illustrating a typical alternative configuration of the well material distribution systems.
Figure 7:
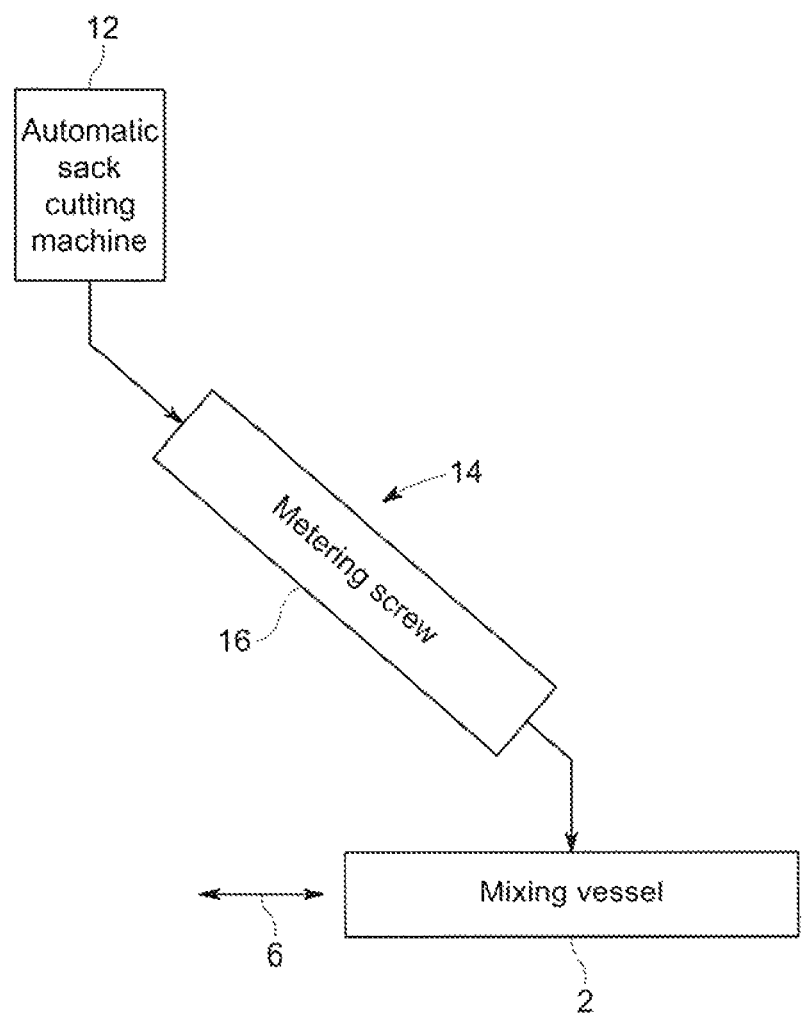
FIG. 7 is a functional block diagram illustrating another typical alternative configuration of the well material distribution systems.

As illustrated in FIGS. 5-7, in some embodiments, the mixing vessel 2 may be disposed along a horizontal axis 6 beneath the ASCM 12. At least one material transfer path 14 may extend from the ASCM 12 directly to the mixing vessel 2. In some embodiments, the material transfer path 14 may include at least one uninclined material transfer path and may be oriented at an angle of between 0 degrees and 90 degrees downwardly with respect to the horizontal axis 6. The material transfer path 14 may have a length or distance of 8 feet or less. In some embodiments, the material transfer path 14 may be a dedicated material transfer path for the transfer of well materials 46 from the ASCM 12 directly into the mixing vessel 2.

As illustrated in FIG. 5, in some embodiments, the material transfer path 14 may include at least one gravity flow conduit 20. The gravity flow conduit 20 may include a pipe, housing or other space which facilitates gravity flow of the well material from the ASCM 12 directly into the mixing vessel 2.

As illustrated in FIG. 6, in some embodiments, the material transfer path 14 may include at least one horizontal metering screw 16 which transfers the well material from the ASCM 12 directly to the mixing vessel 2. The metering screw 16 may include at least one pipe or other conduit or housing (not illustrated) which contains an auger engaged for rotation by an auger motor (not illustrated). Accordingly, the auger may transfer the well material from the ASCM 12 through the housing directly into the mixing vessel 2 responsive to operation of the auger motor. As illustrated in FIG. 7, in still other embodiments, the material transfer path 14 may include at least one metering screw 14 which is oriented at a downward slope or angle from the ASCM 12 directly to the mixing vessel 2.

Referring again to FIGS. 1-3 of the drawings, in typical application of the system 1, the mixing vessel 2 can be used to simultaneously implement multiple operations in a hydrocarbon well drilling completion, production, maintenance and/or remediation project. The mixing vessel 2 may be capable of mixing single batch compounds or multiple compounds. For example and without limitation, the mixing vessel 2 can be used to simultaneously implement two or more of the following operations: mixing of drilling fluids, mixing of cement and cement spacers, mixing and filtering of completion brine and handling cuttings for zero-discharge applications. In some applications, multiple mixing and/or material handling operations can be simultaneously carried out in multiple mixing compartments (not illustrated) in the mixing vessel 2 without cross-contamination of the compound mixtures. All of the operations which are required throughout the hydrocarbon well drilling and completion project can be simultaneously or successively carried out in the mixing vessel 2.

Throughout the project, well materials 46 may be distributed from the large bags 64, rig bulk system 78, active mud lines 80 and/or auxiliary hopper 81 into the mixing vessel 2 typically through the respective vessel inlet conduits 8. Liquid additives 79 may be introduced into the mixing vessel 2 typically through the corresponding vessel inlet conduit 8. The well materials 46 may be used to form drilling mud or fluid in the active pit 82 and/or downhole mud pit 84 for the drilling operation and/or cement for the casing 97, centralizers and the like in the hydrocarbon well 88 using the cementing unit 83.

Figure 8:
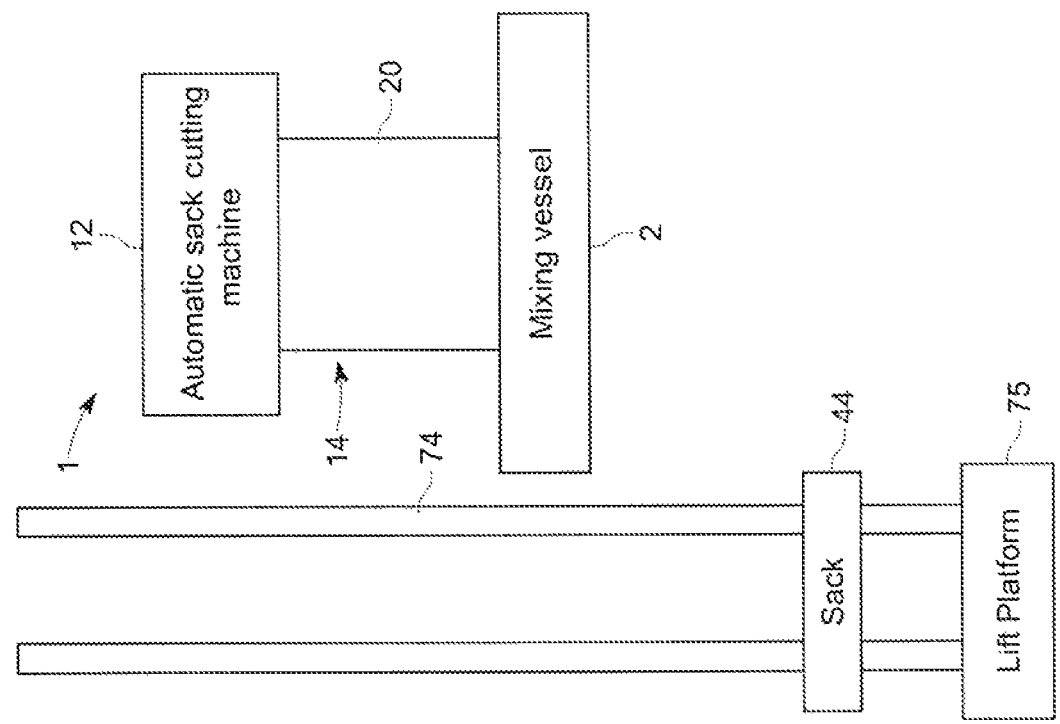

Referring next to FIGS. 8-12 of the drawings, a typical sequential application of the system 1 is illustrated. In FIG. 8, at least one material-containing sack 44 may initially be placed on the lift platform 75 of the sack lifting platform assembly 74. In some applications, the material-containing sack 44 may contain at least one well material used in the formulation of drilling mud or fluid and/or cement.

Figure 9:
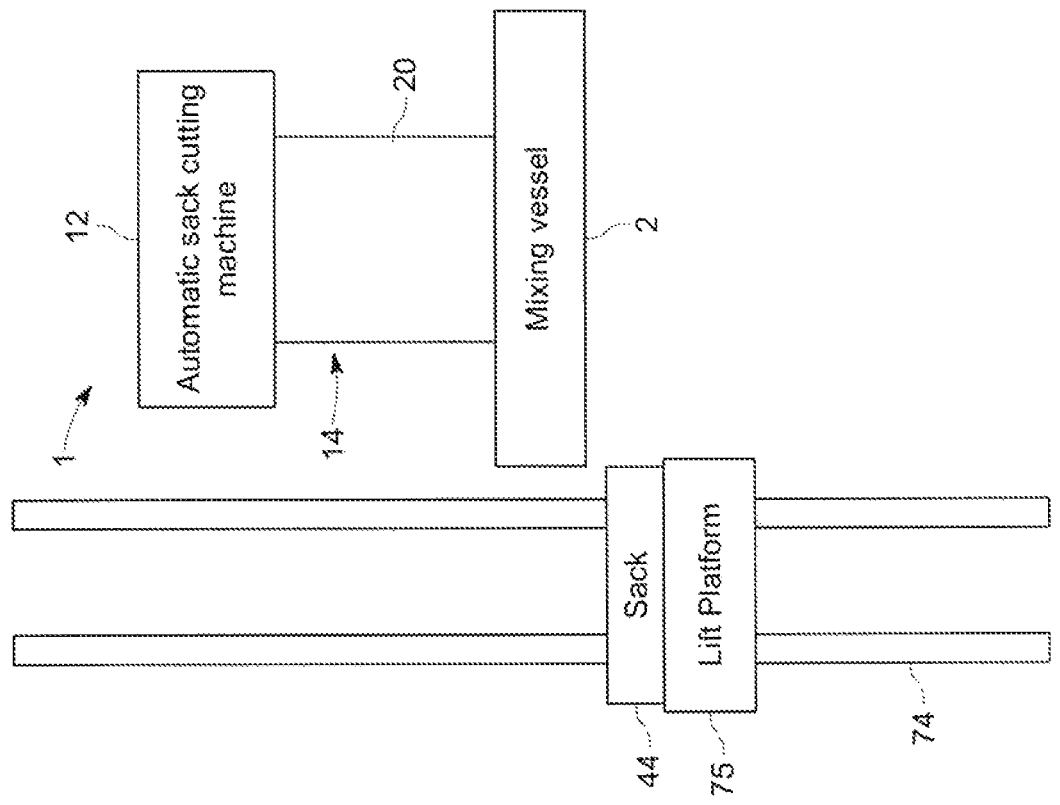
FIGS. 8-12 are block diagrams illustrating typical sequential operation of the well material distribution systems.
Figure 10:
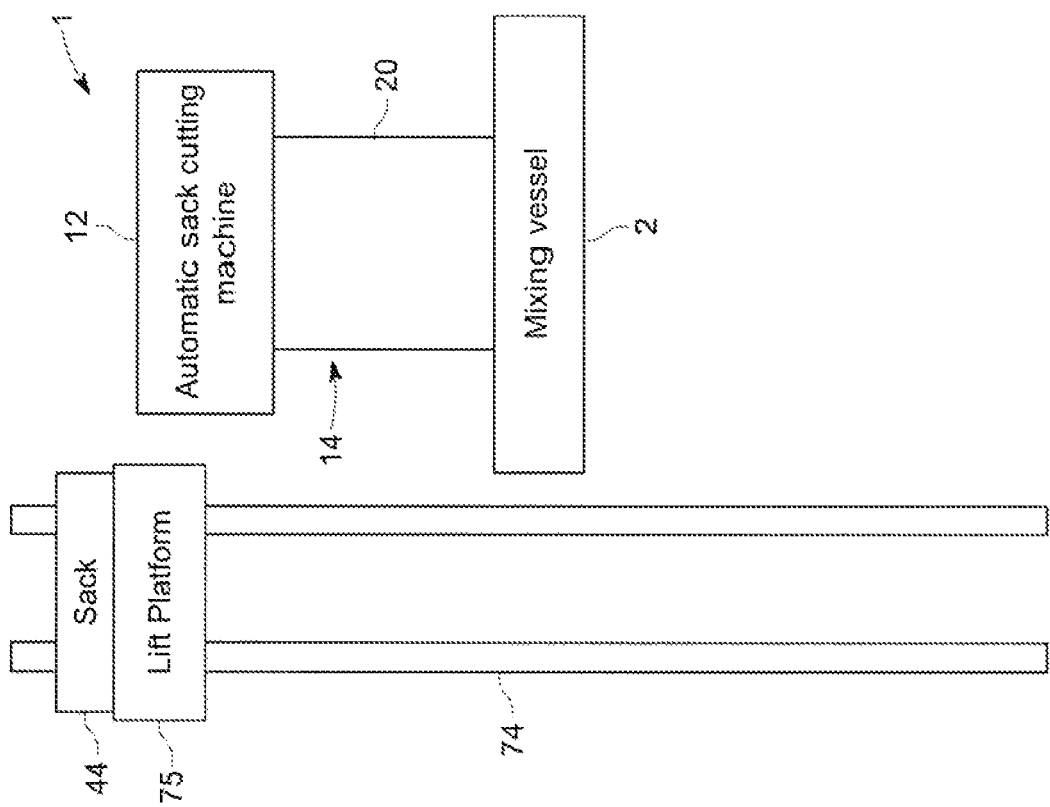

In FIGS. 9 and 10, the lift platform 75 of the sack lifting platform assembly 74 may lift the material-containing sack 44 to the level of the ASCM 12.

Figure 11:
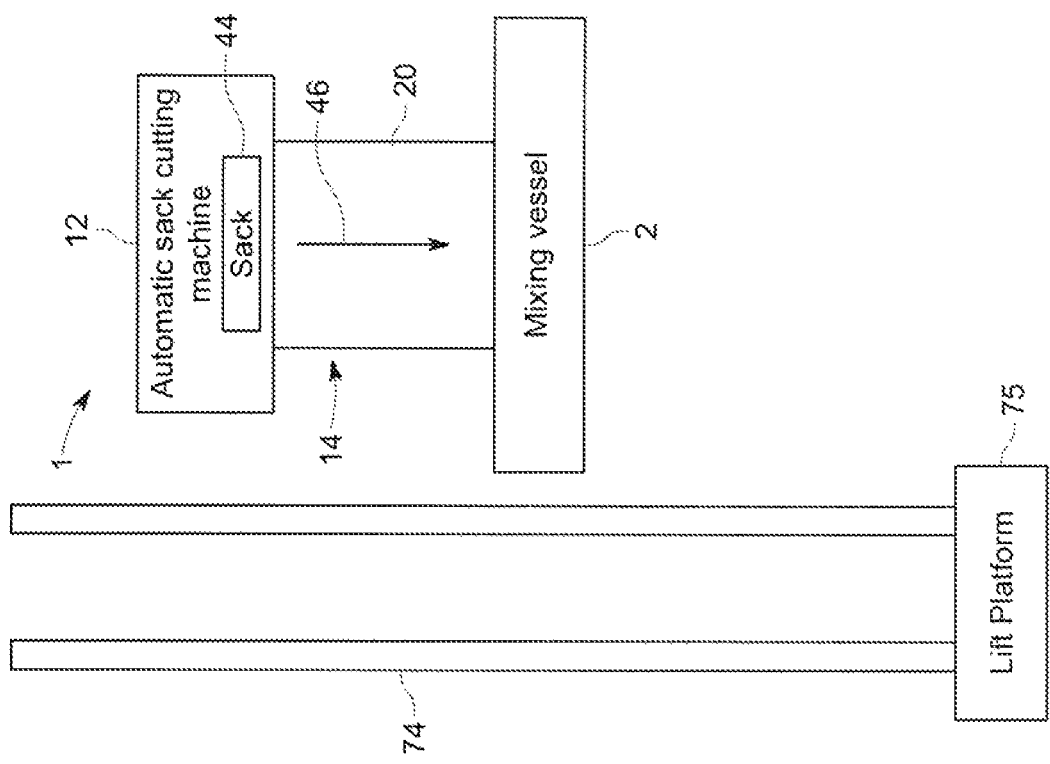
Figure 12:
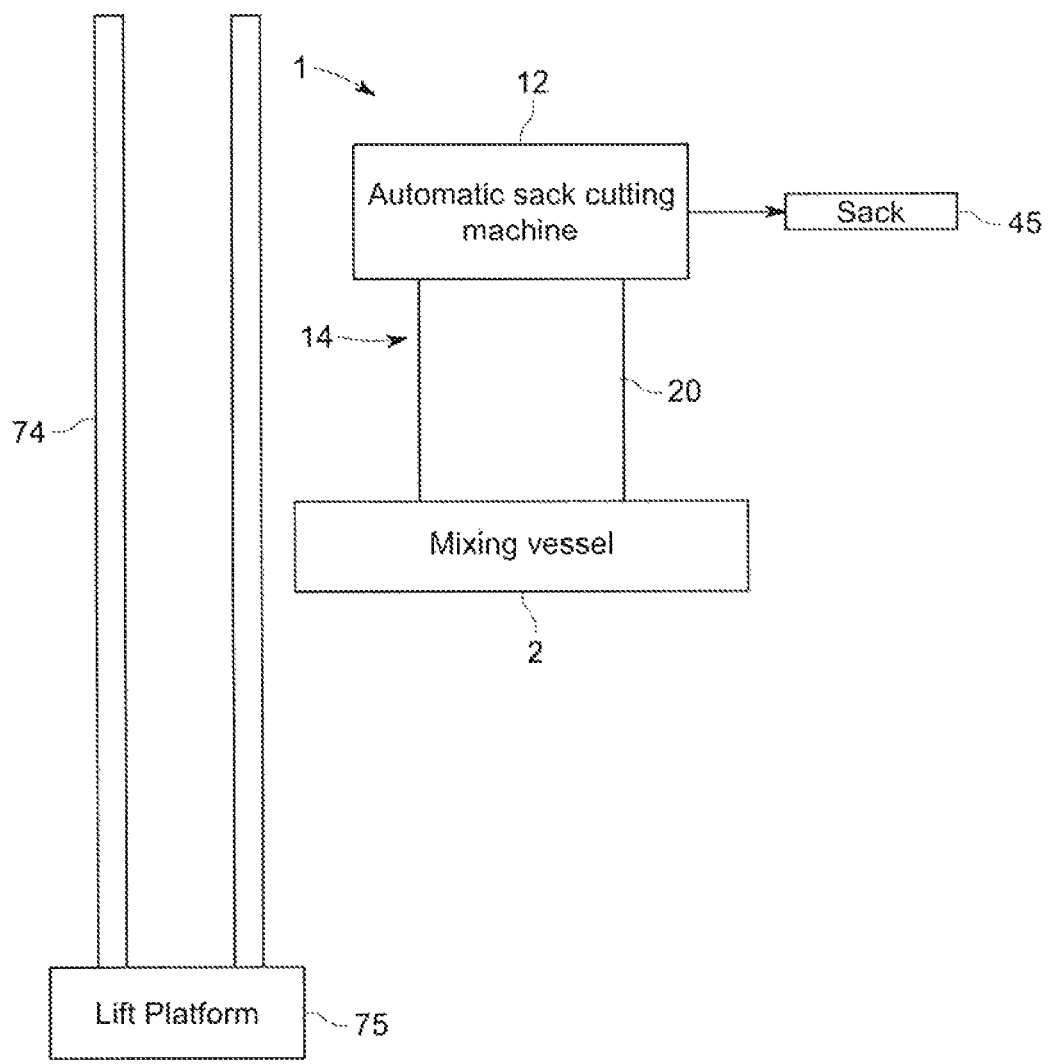

As illustrated in FIG. 11, the material-containing sack 44 may be removed from the lift platform 75 and placed in the ASCM 12. The ASCM 12 may automatically cut, open and remove the well materials 46 from the well-containing sack 44. The ASCM 12 may further discharge the removed well materials 46 directly into the mixing vessel 2 along the material transfer path 14. As illustrated in FIG. 12, the ASCM 12 may discharge the empty material-containing sack 45 into a semi-compactor or other suitable waste receptacle (not illustrated).

Figure 13:
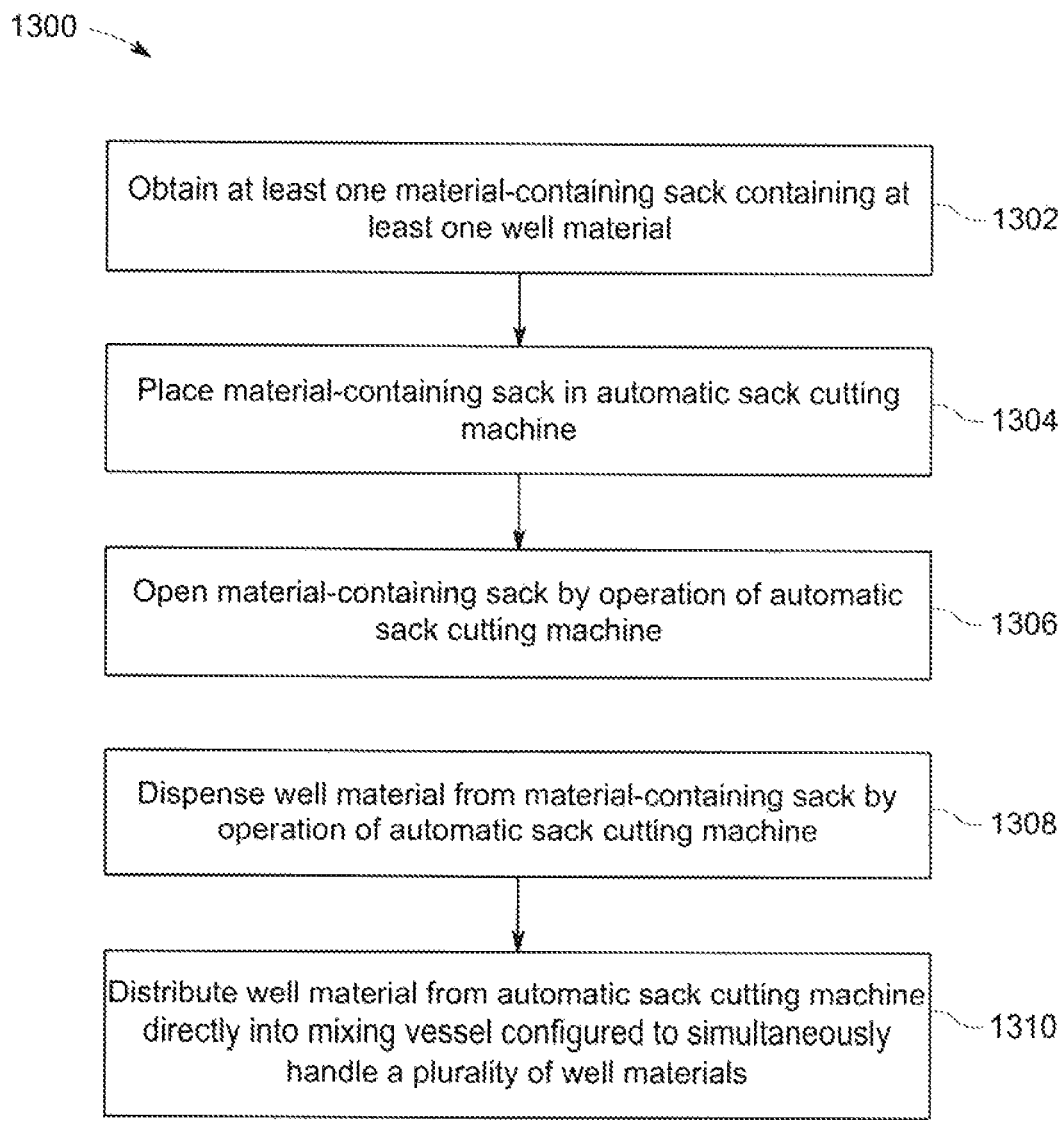
FIG. 13 is a flow diagram of an illustrative embodiment of the well material distribution methods.

Referring next to FIG. 13 of the drawings, a flow diagram 1300 of an illustrative embodiment of the well material distribution methods is illustrated. At Step 1302, at least one material-containing sack containing at least one well material may be obtained. At Step 1304, the material-containing sack may be placed in an automatic sack cutting machine (ASCM). At Step 1306, the material-containing sack may be opened by operation of the ASCM. At Step 1308, the well material may be dispensed from the material-containing sack by operation of the ASCM. At Step 1310, the well material may be distributed from the ASCM directly into a mixing vessel configured to simultaneously handle a plurality of well materials.

Figure 14:
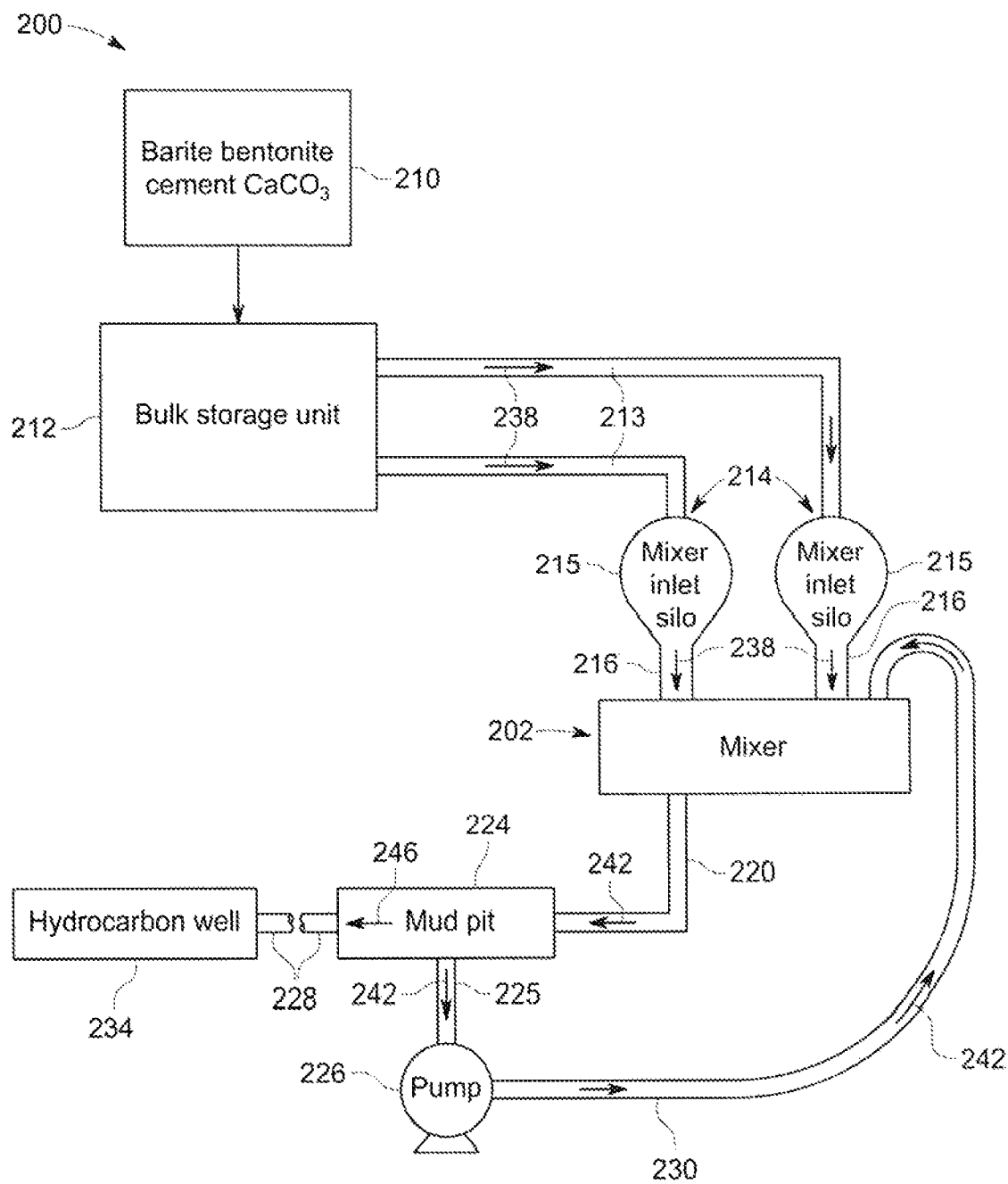
FIG. 14 is a functional block diagram of an illustrative embodiment of the weighted well material distribution systems.
Figure 15:
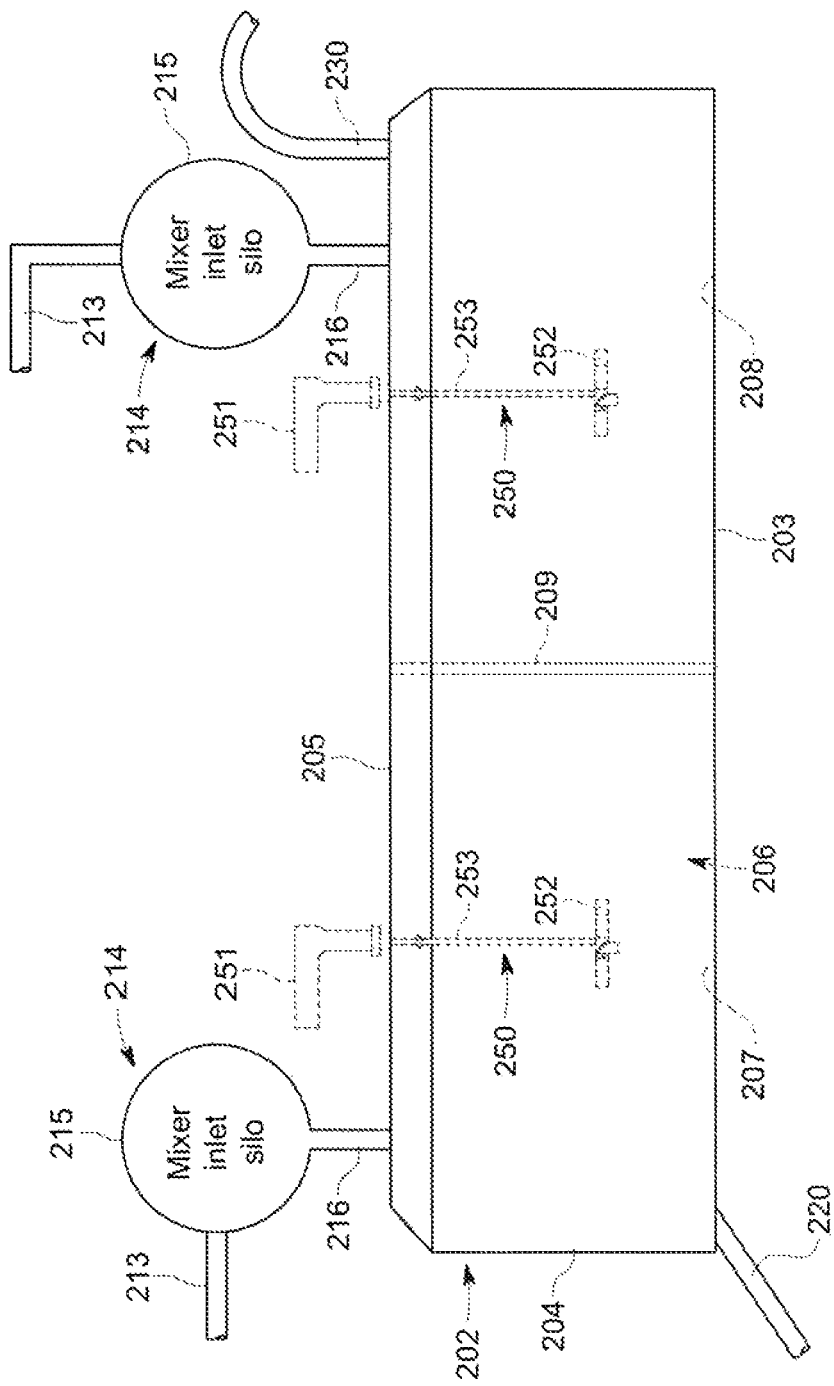
FIG. 15 is a front view of a typical mixing vessel with a pair of mixer inlet silos disposed directly above the mixing vessel according to an illustrative embodiment of the weighted well material distribution systems.

Referring next to FIGS. 14 and 15 of the drawings, an illustrative embodiment of the weighted well material distribution systems, hereinafter system, is generally indicated by reference numeral 200 in FIG. 14. In some embodiments, the system 200 may be included as part of a well material distribution system such as the system 1 which was heretofore described with respect to FIGS. 1-12. Accordingly, at least some of the components of the system 200 may be mounted on a rig platform 60 (FIG. 1) and may service an onshore or offshore hydrocarbon well 234 (FIG. 14).

As illustrated in FIG. 14, the system 200 may include at least one bulk storage unit 212. The bulk storage unit 212 may be any suitably sized and configured vessel which is suitable to contain a supply of well material components 210. In some applications, the well material components 210 may include powdered or particulate drilling fluid components such as barite, bentonite, cement and $CaCO_3$ (calcium carbonate), for example and without limitation. In other applications, the well material components 210 may include other components used in various hydrocarbon well operations. In some embodiments, the bulk storage unit 212 may have a volumetric capacity of about 1,000-4,000 cubic feet.

At least one mixer inlet silo 214 may be disposed in material-receiving communication with the bulk storage unit 212. In some embodiments, each mixer inlet silo 214 may include a main silo portion 215 and a silo outlet conduit 216 which extends from the main silo portion 215. In some embodiments, the main silo portion 215 of each mixer inlet silo 214 may be generally spherical or teardrop-shaped and may have a volumetric capacity of about 20-100 cubic feet. The silo outlet conduit 216 may be cylindrical.

The main silo portion 215 of each mixer inlet silo 214 may be disposed in material-receiving communication with the bulk storage unit 212 through a corresponding bulk storage unit outlet conduit 213. In some embodiments, each bulk storage unit outlet conduit 213 may facilitate gravity-fed distribution of the bulk well material 238 which includes the well material components 210 into the main silo portion 215 of each corresponding mixer inlet silo 214. In other embodiments, each bulk unit outlet conduit 213 may facilitate pneumatic, mechanical and/or other distribution of the bulk well material 238 into the mixer inlet silo 214.

At least one mixing vessel 202 may be disposed in material-receiving communication with the silo outlet conduit 216 of each mixer inlet silos 214. The mixing vessel 202 may facilitate mixture of the bulk well material 238 with water and/or other liquid and/or solid additives to form a liquid or semi-liquid well material mixture 242. In some embodiments, the mixing vessel 202 may have a design which is the same as or similar to the design of the mixing vessel 2 which was heretofore described with respect to FIGS. 2-4. Accordingly, as illustrated in FIG. 15, the mixing vessel 202 may be generally elongated with a mixing vessel bottom 203. A mixing vessel wall 204 may extend from the mixing vessel bottom 203 to form a mixing vessel interior 206. A mixing vessel lid 205 may be provided on the mixing vessel wall 204 to close the mixing vessel interior 206. The mixing vessel lid 205 may be fitted with one or more viewing windows (not illustrated) which enable an operator of the mixing vessel 202 to view the contents of the mixing vessel interior 206 during mixing. In some embodiments, at least one mixing vessel partition 209 may divide the mixing vessel interior 206 into at least a first mixing compartment 207 and a second mixing compartment 208.

At least one mixing device 250 may be disposed in the mixing vessel interior 206 of the mixing vessel 202 to facilitate mixing of the bulk well materials 238 with the additives and formation of the well material mixture 242. In some embodiments, at least one mixing device 250 may be disposed in each corresponding first mixing compartment 207 and second mixing compartment 208 of the mixing vessel 202. Each mixing device 250 may have any design which is suitable for the purpose. In some embodiments, each mixing device 250 may be a gear-driven vertical mixer including an electric motor 251. An agitator drive shaft 253 may be drivingly engaged by the electric motor 251. The agitator drive shaft 253 may extend vertically from the electric motor 251 through a shaft opening (not illustrated) in the mixing vessel lid 205 into the mixing vessel interior 206. Paddle agitators 252 may extend from the agitator drive shaft 253. Accordingly, responsive to operation of the electric motor 251, the agitator drive shaft 253 may rotate the paddle agitators 252 in the corresponding first mixing compartment 207 or second mixing compartment 208 to mix the contents of each. In some embodiments, the mixing vessel 202 may have a design which is the same as or similar to that of the mixing vessel which is described in U.S. application Ser. No. 15/885,997, filed Feb. 1, 2018 and entitled MIXING APPARATUS, which application is hereby incorporated by reference herein in its entirety.

As further illustrated in FIG. 14, at least one mud pit 224 may be disposed in fluid communication with the mixing vessel 202. For land rig applications, the mud pit 224 may have a rectangular steel construction and may include partitions (not illustrated) which divide the mud pit 224 into multiple compartments each having a selected volumetric capacity (such as 200 barrels, for example and without limitation). Active mud systems may include multiple units which are set in series. For offshore rig applications, the mud pit 224 may be fabricated into the drilling vessel and may have a capacity of 1,000 barrels, for example.

At least one gravity flow mixer outlet conduit 220 may establish fluid communication between the mixing vessel interior 206 of the mixing vessel 202 and the mud pit 224. The gravity flow mixer outlet conduit 220 may facilitate gravity flow of the well material mixture 242 from the mixing vessel 202 to the mud pit 224.

At least one liquid pump 226 may be disposed in fluid communication with the mud pit 224 through at least one pump inlet conduit 225. At least one mixer return conduit 230 may extend from the liquid pump 226 to the mixer 202. In typical operation of the system 200, which will be hereinafter described, the liquid pump 226 may facilitate flow of at least a portion of the well material mixture 242 from the mud pit 224 through the mixer return conduit 230 back into the mixing vessel 202 typically for addition of additional bulk well material 238 and/or additives to the well material mixture 242. Addition of selected quantities and types of the bulk well material 238 and/or additives may be used to control the weight and/or density of the well material mixture 242 and a homogenous well material mixture 246 (FIG. 14) which is ultimately formed therefrom for a particular downhole application.

At least one mud pit outlet conduit 228 may be disposed in fluid communication with the mud pit 224. The mud pit outlet conduit 228 may facilitate distribution of a homogenous well material mixture 246 from the mud pit 224 to the hydrocarbon well 234. In some applications, the homogenous well material mixture 246 may be drilling fluid or mud. In other applications, the homogenous well material mixture 246 may include other well materials which are distributed downhole into the hydrocarbon well 234 in well drilling, production, maintenance or remediation operations.

In typical application of the system 200, a selected quantity of the well material components 210 may be placed in the bulk storage unit 212. The well material components 210 may include but are not limited to solid particles, powders, dust, liquids or combinations thereof which may be used in the formulation of active mud, drilling mud, cement and/or other solids or liquids used to form the homogenous well material mixture 246 in the drilling, production, maintenance, remediation and/or other operations of the hydrocarbon well 234. In some applications, the well material components 210 may include components used in the formation of drilling fluid. Accordingly, the well materials 210 may include such components as barite, bentonite and $CaCO_3$ (calcium carbonate), for example and without limitation.

The bulk storage unit outlet conduits 213 may distribute the bulk well material 238 which includes the well material components 210 from the bulk storage unit 212 to the mixer inlet silos 214. In some embodiments, each bulk unit outlet conduit 213 may facilitate pneumatic, mechanical and/or other distribution of the bulk well material 238 from the bulk storage unit 212 into the mixer inlet silos 214. In some embodiments, the bulk well material 238 may additionally or alternatively flow from the bulk storage unit 212 to the mixer inlet silos 214 via gravity flow.

Each mixer inlet silo 214 may hold a selected volume or quantity of the bulk well material 238. In some embodiments, each mixer inlet silo 214 may hold a quantity of about 20-100 cubic feet of the bulk well material 238. The bulk well material 238 flows by gravity from the main silo portion 215 through the silo outlet conduit 216 of each mixer inlet silo 214 into the mixing vessel interior 206 (FIG. 15) of the mixing vessel 202. Selected volumes or quantities of water and/or other liquid and/or solid additive or combinations of liquid and/or solid additives (not illustrated) may be introduced into the mixing vessel interior 206 of the mixing vessel 202 through conduits (not illustrated) to form the liquid well material mixture 242, typically according to the knowledge of those skilled in the art. The mixing device or devices 250 (FIG. 15) may be operated to thoroughly mix the bulk well material 238 with the water and/or other liquid to form the liquid well material mixture 242.

The liquid pump 226 may be operated continually or for a selected period or periods of time to pump a portion of the liquid well material mixture 242 from the mud pit 224 through the mixer return conduit 230 back to the mixing vessel 202. Additional bulk vessel material 238 and/or additives may be added from the mixer inlet silo or silos 214 to the returned well material mixture 242 to achieve a desired weight and/or density of the well material mixture 242. The mixing vessel 202 may be operable to mix the returned well material mixture 242 with the bulk well material 238 which enters the mixing vessel 202 from the mixer inlet silos 214 to further weight and densify the well material mixture 242. Accordingly, the weight and density of the well material mixture 242 may be adjusted to achieve a desired weight and density of the homogenous well material mixture 246 which is suitable for a particular application. The weighted and densified well material mixture 242 may flow from the mixing vessel 202 through the mixer outlet conduit 220 and into the mud pit 224, where the returned, weighted and densified well material mixture 242 may be added to the well material mixture 242 which remains in the mud pit 224. The resulting homogenous well material mixture 246 may be pumped from the mud pit 224 through the mud pit outlet conduit 228 and into the hydrocarbon well 234. In some applications, the homogenous well material mixture 246 may include drilling fluid which is pumped from the mud pit 224 into the hydrocarbon well 234 through a drill string and drill bit (not illustrated), typically in the conventional manner.

It will be appreciated by those skilled in the art that the system 200 facilitates thorough mixing of the well material mixture 242 in the mixing vessel 202 and mud pit 224 to form the homogenous well material mixture 246 in the mud pit 224 prior to distribution of the homogenous well material mixture 246 from the mud pit 224 downhole into the hydrocarbon well 234. This expedient prevents the barite and other well material components 210 from settling to the bottom and in the corners of the mud pit 224, eliminating the need to clean unnecessary waste from the mud pit 224 and preventing waste of time and natural resources. The homogenous well material mixture 246 which is pumped downhole into the wellbore of the hydrocarbon well 234 prevents premature reduction in the life of pump parts and eliminates or reduces the incidence of downhole tool failures.

Figure 16:
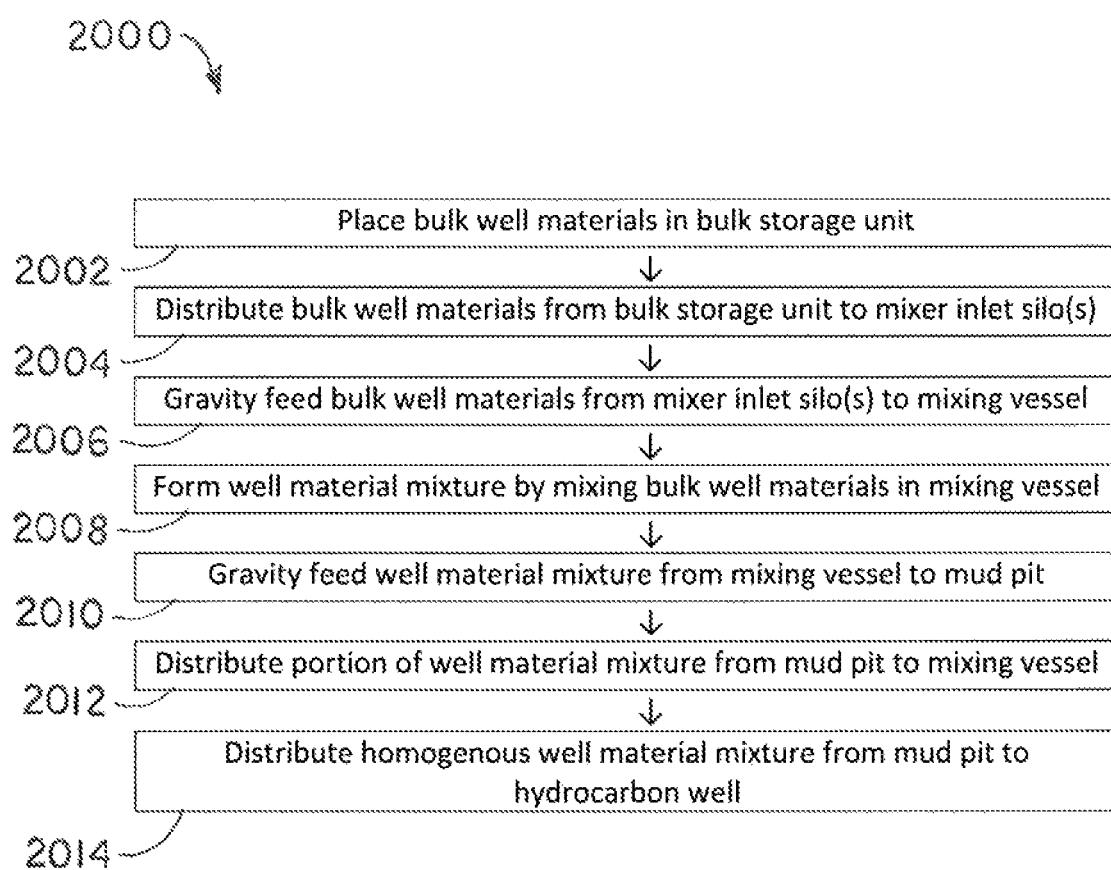
FIG. 16 is a flow diagram of an illustrative embodiment of the weighted well material distribution methods.

Referring next to FIG. 16 of the drawings, a flow diagram of an illustrative embodiment of the weighted well material distribution methods is generally indicated by reference numeral 2000. At Step 2002, bulk well materials may be placed in a bulk storage unit on an onshore or offshore rig. In some embodiments, the bulk well materials may include powdered or particulate drilling fluid components such as barite, bentonite, cement and $CaCO_3$ (calcium carbonate), for example and without limitation, which are used in the formation of drilling fluid.

At Step 2004, the bulk well materials may be distributed from a bulk storage unit to at least one mixer inlet silo via gravity, pneumatic transfer, mechanical transfer and/or other transfer mechanism.

At Step 2006, the bulk well materials may be gravity fed from the mixer inlet silo(s) into a mixing vessel. The mixing vessel may include a mixing vessel bottom; a mixing vessel wall extending from the mixing vessel bottom; a mixing vessel lid on the mixing vessel wall; a mixing vessel interior formed by and between the mixing vessel bottom, the mixing vessel wall and the mixing vessel lid; and at least one mixing device disposed in the mixing vessel interior.

At Step 2008, a well material mixture may be formed by mixing the bulk well materials with water and/or other liquid and/or solid additives in the mixing vessel typically via operation of the mixing device in the mixing vessel interior.

At Step 2010, the well material mixture may be gravity fed from the mixing vessel to a mud pit.

At Step 2012, at least a portion of the well material mixture may be distributed from the mud pit back to the mixing vessel for addition of additional bulk well material and/or additives to the well material mixture. The additional bulk well material and/or additives may weight and/or densify the well material mixture to a selected weight and/or density.

At Step 2014, a homogenous well material mixture may be distributed from the mud pit to the hydrocarbon well. In some applications, the homogenous well material may be drilling fluid which is pumped from the mud pit to the hydrocarbon well through a drill string and drill bit.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A weighted well material distribution method, comprising:
    placing bulk well materials including at least one well material component into at least one mixer inlet silo, the at least one mixer inlet silo including:
        a spherical main silo portion sized and configured to receive the bulk well materials including the at least one well material component; and
        a cylindrical silo outlet conduit communicating with the main silo portion;
    gravity feeding the bulk well materials including the at least one well material component from the spherical main silo portion through the cylindrical silo outlet conduit of the at least one mixer inlet silo into a mixing vessel including:
        a mixing vessel interior; and
        at least one mixing device disposed in the mixing vessel interior;
    forming a well material mixture by mixing the bulk well materials including the at least one well material component in the mixing vessel interior of the mixing vessel via operation of the at least one mixing device;
    distributing the well material mixture from the mixing vessel interior of the mixing vessel to at least one mud pit; and
    distributing a substantially homogenous well material mixture from the at least one mud pit to a hydrocarbon well.

2. The weighted well material distribution method of claim 1 further comprising distributing at least a portion of the well material mixture from the at least one mud pit to the mixing vessel interior of the mixing vessel and adding additional quantities of the bulk well materials to the well material mixture in the mixing vessel interior of the mixing vessel to achieve a selected weight and density of the well material mixture.

3. The weighted well material distribution method of claim 1 wherein gravity feeding the bulk well materials including the at least one well material component from the spherical main silo portion through the cylindrical silo outlet conduit of the at least one mixer inlet silo into the mixing vessel interior of the mixing vessel comprises gravity feeding the bulk well materials including a plurality of well material components from the spherical main silo portion through the cylindrical silo outlet conduit of the at least one mixer inlet silo into the mixing vessel interior of the mixing vessel.

4. The weighted well material distribution method of claim 3 wherein gravity feeding the bulk well materials including the plurality of well material components from the spherical main silo portion through the cylindrical silo outlet conduit of the at least one mixer inlet silo into the mixing vessel interior of the mixing vessel comprises gravity feeding the bulk well materials including barite, bentonite, cement and calcium carbonate from the spherical main silo portion through the cylindrical silo outlet conduit of the at least one mixer inlet silo into the mixing vessel interior of the mixing vessel.

5. The weighted well material distribution method of claim 1 wherein distributing the well material mixture from the mixing vessel interior of the mixing vessel to the at least one mud pit comprises gravity feeding the well material mixture from the mixing vessel interior of the mixing vessel to the at least one mud pit.

6. The weighted well material distribution method of claim 1 wherein placing the bulk well materials including the at least one well material component in the at least one mixer inlet silo comprises distributing the bulk well materials including the at least one well material component from at least one bulk storage unit into the at least one mixer inlet silo.

7. A weighted well material distribution method, comprising:
    placing bulk well materials including at least one well material component in at least one bulk storage unit;
    pneumatically distributing the bulk well materials including the at least one well material component from the at least one bulk storage unit into at least one mixer inlet silo;
    gravity feeding the bulk well materials including the at least one well material comment from the at least one mixer inlet silo into a mixing vessel including:
        a mixing vessel interior; and
        at least one mixing device disposed in the mixing vessel interior;
    forming a well material mixture by mixing the bulk well materials including the at least one well material component in the mixing vessel interior of the mixing vessel via operation of the at least one mixing device;
    distributing the well material mixture from the mixing vessel interior of the mixing vessel to at least one mud pit; and
    distributing a substantially homogenous well material mixture from the at least one mud pit to a hydrocarbon well.

8. A weighted well material distribution method, comprising:

placing bulk well materials including at least one well material component in at least one bulk storage unit;

pneumatically distributing the bulk well materials including the at least one well material component from the at least one bulk storage unit into a plurality of mixer inlet silos;

gravity feeding the bulk well materials including the at least one well material component from the plurality of mixer inlet silos into a mixing vessel including:
- a mixing vessel interior; and
- at least one mixing device disposed in the mixing vessel interior;

forming a well material mixture by mixing the bulk well materials including the at least one well material component in the mixing vessel via operation of the at least one mixing device;

distributing the well material mixture from the mixing vessel to at least one mud pit; and distributing a substantially homogenous well material mixture from the at least one mud pit to a hydrocarbon well.

9. The weighted well material distribution method of claim 8 further comprising distributing at least a portion of the well material mixture from the at least one mud pit into the mixing vessel interior of the mixing vessel and adding additional quantities of the bulk well materials to the well material mixture in the mixing vessel interior of the mixing vessel to achieve a selected weight and density of the well material mixture.

10. The weighted well material distribution method of claim 8 wherein gravity feeding the bulk well materials including the at least one well material component from the plurality of mixer inlet silos into the mixing vessel interior of the mixing vessel comprises gravity feeding the bulk well materials including a plurality of well material components from the plurality of mixer inlet silos into the mixing vessel interior of the mixing vessel.

11. The weighted well material distribution method of claim 10 wherein gravity feeding the bulk well materials including the plurality of well material components from the plurality of mixer inlet silos into the mixing vessel interior of the mixing vessel comprises gravity feeding the bulk well materials including barite, bentonite, cement and calcium carbonate from the plurality of mixer inlet silos into the mixing vessel interior of the mixing vessel.

12. The weighted well material distribution method of claim 8 wherein distributing the well material mixture from the mixing vessel interior of the mixing vessel to the at least one mud pit comprises gravity feeding the well material mixture from the mixing vessel interior of the mixing vessel to the at least one mud pit.

13. A weighted well material distribution method, comprising:

placing bulk well materials including a plurality of well material components in at least one bulk storage unit;

distributing the bulk well materials including the plurality of well material components from the at least one bulk storage unit into at least one mixer inlet silo, the at least one mixer inlet silo including:
- a spherical main silo portion communicating with the bulk storage unit; and
- a cylindrical silo outlet conduit communicating with the main silo portion;

gravity feeding the bulk well materials including the plurality of well material components from the main silo portion through the silo outlet conduit of the at least one mixer inlet silo into a mixing vessel including:
- a mixing vessel bottom;
- a mixing vessel wall extending from the mixing vessel bottom;
- a mixing vessel lid on the mixing vessel wall;
- a mixing vessel interior formed by and between the mixing vessel bottom, the mixing vessel wall and the mixing vessel lid; and
- at least one mixing device disposed in the mixing vessel interior;

forming a well material mixture by mixing the bulk well materials including the plurality of well material components in the mixing vessel interior of the mixing vessel via operation of the at least one mixing device;

distributing the well material mixture from the mixing vessel interior of the mixing vessel to at least one mud pit;

distributing at least a portion of the well material mixture from the at least one mud pit to the mixing vessel interior of the mixing vessel;

adding additional quantities of the bulk well materials to the well material mixture in the mixing vessel interior of the mixing vessel to achieve a selected weight and density of the well material mixture; and distributing a substantially homogenous drilling fluid from the at least one mud pit to a hydrocarbon well.

14. The weighted well material distribution method of claim 13 wherein gravity feeding the bulk well materials including the plurality of well material components from the main silo portion through the silo outlet conduit of the at least one mixer inlet silo into the mixing vessel interior of the mixing vessel comprises gravity feeding the bulk well materials including barite, bentonite, cement and calcium carbonate from the main silo portion through the silo outlet conduit of the at least one mixer inlet silo into the mixing vessel interior of the mixing vessel.

15. The weighted well material distribution method of claim 13 wherein distributing the well material mixture from the mixing vessel interior of the mixing vessel to the at least one mud pit comprises gravity feeding the well material mixture from the mixing vessel interior of the mixing vessel to the at least one mud pit.

16. The weighted well material distribution method of claim 13 wherein distributing the bulk well materials including the plurality of well material components from the at least one bulk storage unit into the at least one mixer inlet silo comprises pneumatically distributing the bulk well materials including the plurality of well material components from the at least one bulk storage unit into the at least one mixer inlet silo.

17. The weighted well material distribution method of claim 13 wherein gravity feeding the bulk well materials including the plurality of well material components from the main silo portion through the silo outlet conduit of the at least one mixer inlet silo into the mixing vessel comprises gravity feeding the bulk well materials including the plurality of well material components from the main silo portion through the silo outlet conduit of each of a plurality of the mixer inlet silos into a plurality of mixing compartments, respectively, in the mixing vessel.

* * * * *